L. L. TATUM.
AUTOMATIC WEIGHING DEVICE.
APPLICATION FILED DEC. 2, 1909.
1,274,209.
Patented July 30, 1918.
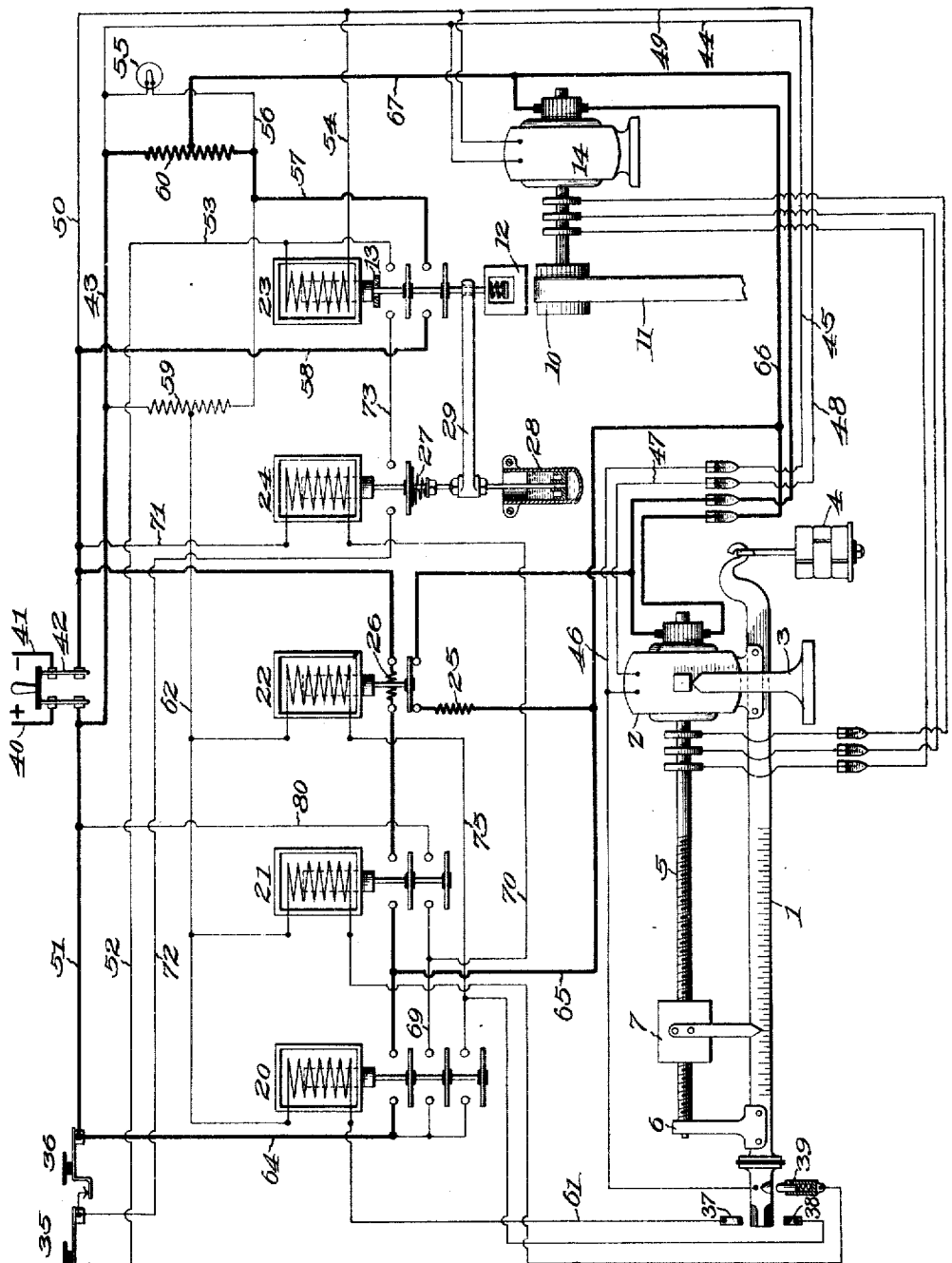

UNITED STATES PATENT OFFICE.

LEWIS L. TATUM, OF MILWAUKEE, WISCONSIN, ASSIGNOR TO THE CUTLER-HAMMER MFG. CO., OF MILWAUKEE, WISCONSIN, A CORPORATION OF WISCONSIN.

AUTOMATIC WEIGHING DEVICE.

1,274,209. Specification of Letters Patent. Patented July 30, 1918.

Application filed December 2, 1909. Serial No. 530,950.

*To all whom it may concern:*

Be it known that I, LEWIS L. TATUM, a citizen of the United States, residing at Milwaukee, in the county of Milwaukee and State of Wisconsin, have invented new and useful Improvements in Automatic Weighing Devices, of which the following is a full, clear, concise, and exact description, reference being had to the accompanying drawing, forming a part of this specification.

My invention relates to improvements in automatic weighing devices.

One of the objects of my invention is to provide electrical means for entirely automatically bringing the scale beam into balance for the final weigh with a very fine degree of accuracy.

A further object of my invention is to provide automatic means for accurately recording the position of the counterpoise on the scale beam when the final balance is obtained.

A still further object of my invention is to provide means for preventing the recording device from making any record if the weighing mechanism is stopped at any time before the final weigh is obtained.

The foregoing and various other objects and advantages of my invention will be hereinafter more clearly and fully set forth.

According to the preferred form of my invention, I propose to operate the counterpoise on the scale beam by means of an electric motor and to mount said motor directly upon the scale beam. The purpose of this arrangement is to eliminate the torque or friction, tending to bias the scale beam in one direction or the other, which is always present where the motor is mounted upon a stationary part. With the motor mounted in this manner, it is likewise impractical to employ the same for operating the recording mechanism. I, therefore, propose to provide a separate motor for operating the recording mechanism and to provide means insuring operation thereof in absolute synchronism with the first mentioned motor. This insures the operation of the counterpoise and recording mechanism in the same manner as if both were operated by a single motor. For governing the two motors, I propose to provide means whereby the same may be started by the operation of a push button and thereafter entirely automatically controlled until the scale beam is brought into balance. Both motors will then be automatically stopped and a record made of the exact position of the counterpoise. Further, I propose to so design the controlling means that the counterpoise will always be moved in the same direction to obtain the final weigh, thus insuring a finer degree of accuracy than could otherwise be obtained.

To more clearly disclose the nature and characteristic feature of my invention, I shall describe the embodiment thereof diagrammatically illustrated in the accompanying drawing. It should, of course, be understood that my invention is not limited to the particular embodiment thereof illustrated in the drawing, but is susceptible of various modifications. Furthermore, it should be understood that certain features of my invention may be used in various other relations.

In the drawing, I have schematically shown a scale beam 1 upon which is rigidly mounted a motor 2. The scale beam is illustrated as having the usual knife edge support 3 and a counterbalance weight 4. The motor 2 is adapted to revolve a screw threaded shaft 5 supported at its free end in a bearing 6, secured to the scale beam 1. The screw threaded shaft 5 passes through a correspondingly screw threaded aperture in the counterpoise, and, when revolved, moves the counterpoise longitudinally of the scale beam. In practice, any preferred form of recording mechanism may be employed. For the purpose of illustration, I have shown a revolving drum 10 adapted to have suitable recording characters thereon over which passes a recording strip or tape 11. Above the drum is arranged a weighted platen 12 adapted, when operated, to cause an impression to be made upon the recording tape. The platen is adapted to be operated in a manner hereinafter set forth. For operating the drum, I have shown a motor 14.

In practice, the motors 2 and 14 may be of any preferred type and controlled in any preferred manner to insure operation thereof in synchronism. The motors illustrated are of the shunt wound direct current type. Such motors, when balanced and connected in parallel, tend to operate in synchronism. However, I prefer to provide each of the motors with a plurality of slip rings connected to the armature windings thereof and to electrically connect the slip rings of one motor to those of the other motor. The motors thus become rotary converters each producing an alternating current. As illustrated, each motor is provided with three slip rings to produce a three phase current, but, of course, the number of slip rings may be varied as desired. With this arrangement, if, from any cause, the speed of one motor tends to exceed that of the other, heavy synchronizing currents will be produced. In other words, the leading machine will send a surge of alternating current to the lagging machine with the result that the same will be accelerated and the leading machine slowed down until both machines are again in synchronism. Thus the recording device and the counterpoise will always be moved in synchronism. As before stated, other types of motors might be used, but direct current machines of the type described are probably the most desirable inasmuch as no special controller is required for starting the same. In practice, I prefer to provide mercury cup connections for the leads to the motor mounted on the scale beam as such connections produce practically no friction.

The controller illustrated includes reversing switches 20 and 21, dynamic braking switch 22, a relay switch 23 and another relay switch 24. Each of these switches is provided with an electroresponsive operating winding.

As will be hereinafter set forth, the switch 20 is adapted to cause operation of the motor 2 in a direction to move the counterpoise to the left, while the switch 21 is adapted to cause the motor to operate in the opposite direction. The switches 20 and 21 also control the direction of operation of the motor 14, which, as will be hereinafter set forth, is connected in parallel with the motor 2. The switch 22, when in down position, is adapted to close a dynamic braking circuit for the two motors including a resistance 25. When in raised position, the switch 22 is adapted to shortcircuit a resistance 26, provided for a purpose hereinafter set forth. The relay switch 23 controls certain circuits hereinafter specified and has a depending tail rod upon which is resiliently mounted the platen 12. The switch 23, when energized, raises the platen 12, and, when deenergized, allows the platen to drop. In descending, the plunger of switch 23 strikes a stop 13, whereupon the resiliently supported platen 12 is given an impetus which drives the same against the recording tape with a hammerlike blow.

The relay switch 24 is provided for controlling the operating winding of the relay switch 23 in the manner hereinafter set forth. The contact member of switch 24 is resiliently supported on a coil spring 27 which is compressed as said contact is raised and which maintains said contact in closed position during the initial part of the descent of the plunger of its operating solenoid. Also the plunger of the operating solenoid of switch 24 is connected to the piston of a dash pot 28 which is provided to retard the descent thereof. Connected to the plunger of the operating winding of switch 24 is an arm 29 provided for the purpose hereinafter set forth.

For starting and stopping the motors at will, I have provided push buttons 35 and 36, the former being spring pressed to open position and the latter being spring pressed to closed position. After the motors have been started by means of the push button 35, further operation thereof is controlled through the electroresponsive instrumentalities before mentioned by means of the scale beam and its coöperating contacts 37, 38 and 39. The contact 37 is so disposed as to be engaged by the extremity of the scale beam when in raised position, while the contacts 38 and 39 are arranged to be engaged by the scale beam when the same is depressed. The contacts 38 and 39 are arranged to be successively engaged by the scale beam, the contact 39 being preferably resiliently supported to assist the scale beam in rising to remain in engagement therewith after the same has been disengaged from contact 38. In balanced position, the scale beam disengages all of its coöperating contacts.

I shall now describe the operation of the device illustrated, at the same time clearly setting forth the circuit connections. Assuming that current is supplied from main lines 40 and 41, if the main switch 42 is closed and the several electro-responsive switches in the position illustrated, no current will be supplied to the motor armatures. However, current will be supplied through the field windings of the motors which are preferably permanently connected in circuit. The field circuit of the motor 2 may be traced from main line 40 by conductors 43, 44, 45 and 46, through said field winding by conductors 47, 48, 49 and 50 to main line 41. The field of the motor 14 is connected directly across conductors 44 and 49, thus being in parallel with the field of motor 2. As illustrated, the scale beam is balanced and out of engagement with all of its coöperating contacts. However, as soon as another load is placed upon the scales, the beam will rise or fall in accordance with the weight of such load. For the purpose of illustration, let it be assumed that the load is of sufficient weight to raise the beam into engagement with contact 37. To set the mechanism in operation to obtain a final weigh, it is only necessary to operate the push button 35. This completes a circuit from main line 40 by conductor 51 to conductor 52, by conductor 53, through the operating winding of relay switch 23, thence by conductor 54 to conductor 49 and thence to main line 41. Thereupon the relay switch 23 responds, thereby raising the platen of the recording device. The relay switch 23 also completes a circuit from conductor 43, through a signal lamp 55, by conductors 56 and 57, through its lowermost contact, by conductor 58, to conductor 50 and thence to main line 41. The purpose of the lamp 55 is to indicate when the mechanism is in operation. Also upon closure of relay switch 23 the resistances 59 and 60 which are in parallel to the lamp 55, are connected across the main lines. The purpose of these resistances will be hereinafter set forth. Upon connection of the resistance 59 across the main lines a circuit may be traced to the scale beam as already described, thence to contact 37, by conductor 61, through the operating winding of switch 20, by conductor 62 through a portion of resistance 59, and thence to conductor 57 through the lowermost contact of switch 23, by conductors 58 and 50 to main line 41. It will thus be seen that a portion of the resistance 59 is connected in series with the operating winding of switch 20, while the remainder of said resistance is in parallel with said winding. By connecting a portion of the resistance 59 in series and the remainder of said resistance in parallel with the winding of said switch, I am enabled to reduce the potential impressed thereon and to regulate the drop in potential across said winding to reduce the arc formed upon interruption of its circuit by the scale beam. The resistance 59 has the same effect upon all other windings connected thereto.

Upon energization of switch 20, circuit is closed from main line 51 by conductor 64, through its uppermost contact, by conductor 65 to conductor 66, thence through the armatures of the motors 2 and 14 in parallel to conductor 67, and thence through the lower portion of resistance 60 and relay switch 23 as already traced to main line 41. Thereupon the motors 2 and 14 are set in operation, the motor 2 operating in a direction to move the counterpoise 7 on the scale beam to the left and the motor 14 operating in a corresponding direction. The resistance 60 is so designed as to permit the motors to operate at a sufficiently high speed and is connected directly across the supply circuit to enable the motors to be reversed in a well known manner by means of single pole switches. Also upon closure of switch 20, a circuit is completed from conductor 64, through its intermediate contact by conductors 69 and 70, through the operating winding of relay switch 24, by conductor 71 to main line 41. Thereupon the switch 24 responds and completes a circuit from main line 40 and conductor 51, through push button 36, by conductor 72 to conductor 73, thence through the upper contact of relay switch 23, and through the operating winding of said switch 23, to main line 41 as already traced. This establishes a maintaining circuit for the operating winding of switch 23 after which the push button 35 may be released without affecting said winding. Further, upon closure of switch 20 a circuit is completed from conductor 64 to conductor 75, through the operating winding of the dynamic braking switch 22 to conductor 62, and thence through the resistance 59 to main line 41 as already traced. Thereupon the switch 22 responds and opens the dynamic braking circuit including resistance 25. Opening of this circuit occurs substantially simultaneously with the closure of the circuits of the two motors, and, therefore, the motors quickly come up to normal speed.

The motors having now been set in operation, will move the counterpoise and recording mechanism in synchronism. As soon as the counterpoise has been moved a sufficient distance to overbalance the scale beam, said beam will be withdrawn from engagement with contact 37. This causes the deënergization of switch 20 which thereupon disconnects the motors from circuit and causes deënergization of the dynamic braking switch 22 and relay switch 24. Of course, the dropping of the dynamic braking switch causes the motors to quickly come to rest, but the motors in the meantime will have drifted sufficiently to cause the counterpoise to move the scale beam downwardly into engagement with contacts 38 and 39. Immediately upon engagement of the scale beam with contact 39 circuit is closed through the operating winding of switch 21, while upon engagement of the scale beam with the contact 38, circuit will be reclosed through the operating winding of the dynamic braking switch 22. Energization of the switch 21 results in reclosing the circuits of the motor armatures, but causing current to flow therethrough in an opposite direction to that previously set forth. The circuit through the motor armatures may now be traced from conductor 43, through the other portion of resistance 60, by conductor 67, through the motor armatures in parallel to conductor 66, thence by conductor 65, through the uppermost contact of switch 21 and through resistance 26 to main line 41. Thereupon the motors are set in operation in an opposite direction to that previously described. This results in moving the counterpoise on the scale beam to the right and setting back the drum of the recording mechanism in accordance with the position of the counterpoise.

Immediately upon closure of switch 21 circuit is again completed from main line 40, by conductor 80, through said switch to conductor 70 and thence through the operating winding of relay switch 24. Consequently, circuit of the operating winding of relay switch 24 will only be momentarily interrupted. As previously stated, the descent of the switch 24 is retarded by the dash pot 28 and the spring 27 maintains said switch closed, after the plunger of its operating solenoid starts in its descent. Hence, before the relay switch 24 has an opportunity to open, its operating winding is again energized. This insures the maintenance of the circuit through the operating winding of relay switch 23, thereby maintaining the platen of the recording mechanism in raised position during the reversal of the motors.

Returning, now, to the operation of the counterpoise on the scale beam, it will be seen that when said counterpoise nearly approaches the balancing position, the resiliency of the contact 39 will assist the scale beam to rise out of engagement with contact 38. Thereupon the energizing circuit of switch 22 is interrupted, causing said switch to drop. Dropping of switch 22 causes the insertion of the resistance 26, normally shortcircuited thereby, in series with the motor armatures, and further completes the dynamic braking circuit for the motors including the resistance 25. The insertion of the series resistance 26 and the parallel resistance 25 results in slowing down the motors to a slow speed, thereby moving the counterpoise 7 slowly into balancing position. When the counterpoise has finally been brought into a position to balance the scale beam, said beam will disengage contact 39, thereby interrupting the circuit of switch 21, which immediately disconnects the motor armatures from circuit. The speed of the motors having been reduced to a very low degree, the same will almost instantly be brought to rest under dynamic braking action. Thus the counterpoise will be automatically stopped in a position to exactly balance the scale beam. Also, upon deënergization of switch 21, the circuit of the operating winding of switch 24 is immediately interrupted. Thereupon the switch 24 tends to open against the action of the dash pot 28. When the relay switch 24 finally opens, it interrupts the circuit of the operating winding of relay switch 23, thereby releasing the platen of the printing mechanism which thereupon operates in the manner heretofore set forth to make a permanent record on the tape 11. In practice, it may happen that the scale beam, when being brought into balance, will vibrate, but such vibration will be of short duration. Thus the dash pot 28 may be adjusted to prevent opening of the relay switch 24 until such vibration ceases, and, consequently, the platen of the recording device will not be released until the scale beam comes to rest in balanced position. This insures an exact record of the final weigh.

In practice, contingencies might arise which would require stopping of the weighing mechanism before the final weigh has been obtained. In such cases it would be undesirable to make a record on the tape 11. It is to meet such contingencies that I have provided the arm 29 connected to the relay switch 24. The function of this arm is to block the descent of the platen 12 if the switch 23 is deënergized prior to switch 24. As illustrated, the end of the arm 29 is in the path of the lower contact of switch 23, and, consequently, if the switch 23 is deënergized prior to switch 24, it cannot descend until said switch 24 is deënergized. Then both switches will be retarded by the dash pot 28 with the result that the platen will not be given a sufficient impetus to force the same against the tape 11. As previously set forth, when a final weigh is obtained, the switch 24 is deënergized prior to switch 23, and, consequently, the arm 29 will not interfere with the operation of the platen under such condition. The motors may be stopped at will by merely operating the push button 36, which is connected in the maintaining circuit of switch 23 and which, therefore, causes deënergization of said switch. Opening of switch 23 in turn causes deënergization of all remaining switches, thereby stopping both motors without making a record on the tape 11.

Having thus described my invention, what I desire to secure by Letters Patent, is:—

1. The combination of a scale beam, a counterpoise thereon and a motor fixed to said beam for operating said counterpoise, said motor being pivotally supported and its pivot forming the fulcrum of said beam.

2. In combination, a scale beam, a counterpoise thereon, an electric motor for operating said counterpoise, and means for automatically reversing the motor as the scale beam moves from one extreme position to the other and for automatically stopping the motor when the counterpoise has brought said scale beam into balance, said means being effective to stop the motor for final weigh only when the balance has been obtained by movement of said scale beam in a predetermined direction.

3. In combination a scale beam, a counterpoise thereon, a recording device, separate power means for automatically operating said counterpoise and said recording device and means insuring synchronous operation of said operating means.

4. In combination, a scale beam, a counterpoise thereon, a recording device, separate means for operating said counterpoise and said recording device, means insuring synchronous operation of said operating means and means for automatically making a permanent record from said recording device when said beam is balanced.

5. In combination, a scale beam, a counterpoise thereon, a recording device, separate electroresponsive means for operating said counterpoise and said recording device, and means insuring synchronous operation of said electroresponsive means.

6. In combination, a scale balancing mechanism, an electric motor for operating the same, a recording device, an electric motor for operating said recording device and electrical connections insuring operation of said motors in synchronism.

7. In combination, a scale balancing mechanism, a recording device, independent direct current dynamo electric machines for operating said mechanism and said device, said dynamo electric machines each being provided with slip rings connected to the armature windings thereof, and electrical connections between the slip rings and said motor for insuring synchronous operation thereof.

8. In combination, an automatic weighing device, a recording device therefor including a motor driven part, means insuring synchronous operation of said weighing device and the motor driven part of said recording device, automatic means for making a permanent record from said device and means associated with said weighing device to insure operation of said last mentioned means only after the final balance has been obtained.

9. In combination, an automatically operated weighing mechanism, a recording device therefor including a movable part, means insuring synchronous operation of said weighing mechanism and said movable part of said recording device, means for automatically making a permanent record from said device when said weighing mechanism is stopped at the final weigh, and automatic means for rendering said last mentioned means inoperative when the weighing mechanism is stopped before the final weigh.

10. In combination, a scale beam, a counterpoise thereon, an electric motor mounted upon said scale beam for operating said counterpoise, a recording device including a movable part, an electric motor for operating the movable part of said recording device, means for simultaneously starting said motors and automatically and simultaneously stopping the same when said counterpoise has been moved to balance said beam and means insuring synchronous operation of said motors.

11. In combination, a scale beam, a counterpoise thereon, a direct current motor mounted upon said beam for operating said counterpoise, a recording mechanism, a direct current motor for operating the same, said motors being connected in parallel and each having slip rings for supplying alternating current, electrical connections between the slip rings of said motors for maintaining said motors in step, and means for automatically stopping said motors when said scale beam is balanced.

12. In combination, a scale beam, an electrically operated counterpoise movable on said beam, circuit connections established by said beam when in one extreme position for insuring operation of said counterpoise to move said beam to its other extreme position, circuit connections established by said scale beam when in the latter position for causing said counterpoise to move in an opposite direction, and circuit connections established as said beam leaves the latter position for slowing down said counterpoise and stopping the same when said beam is balanced.

13. In combination, a scale beam, a motor operated counterpoise movable on said beam, electroresponsive means adapted when said beam is in one extreme position, to cause said counterpoise to operate to move said beam to its other extreme position, and electroresponsive means for reversing the operation of said counterpoise when the beam reaches the latter position and for slowing down and stopping said counterpoise as said beam moves into balanced position.

14. In combination, a scale beam, a counterpoise thereon, an electric motor for operating said counterpoise, electroresponsive means adapted, when said beam is in one extreme position, to cause said motor to move said counterpoise until said beam reaches its other extreme position, electroresponsive means for reversing the motor when said beam reaches the latter position, a resistance adapted to be connected in series with the motor, a resistance adapted to be connected across the terminals of the motor armature and electroresponsive means for controlling said resistances, said last two mentioned means being adapted to successively insert said resistances and disconnect the motor from circuit to slow down and stop the motor under dynamic braking action as the beam assumes balanced position.

15. In combination, a scale beam, a counterpoise thereon, a motor mounted upon said scale beam for operating said counterpoise, a recording device, an electric motor for operating said recording device, means for maintaining said motors in step, circuit connections established when said beam is in one extreme position for insuring operation of both of said motors until said beam moves into its other extreme position, circuit connections established upon said beam reaching the latter position to reverse both motors, and circuit connections established upon said beam leaving the latter position for slowing down both motors and automatically stopping the same when said beam reaches balanced position.

16. In combination, a scale beam, a counterpoise thereon, a motor mounted upon said scale beam for operating said counterpoise, a recording device, an electric motor for operating said recording device, means for maintaining said motors in step, circuit connections established when said beam is in one extreme position for insuring operation of both of said motors until said beam moves into its other extreme position, circuit connections established, upon said beam reaching the latter position, for reversing both motors, circuit connections established upon said beam leaving the latter position for slowing down both motors and stopping the same when said beam reaches balanced position, automatic means for taking a permanent record from said recording device, and means for preventing operation of said last mentioned means for a temporary period after said scale beam assumes balanced position.

In witness whereof, I have hereunto subscribed my name in the presence of two witnesses.

LEWIS L. TATUM.

Witnesses:
S. W. FITZ GERALD,
GEORGE HAYNES.

Copies of this patent may be obtained for five cents each, by addressing the "Commissioner of Patents, Washington, D. C."